July 30, 1957 — S. H. PETRY ET AL — 2,800,834
PHOTOGRAPHIC EXPOSURE PROBE DEVICE
Filed April 19, 1954
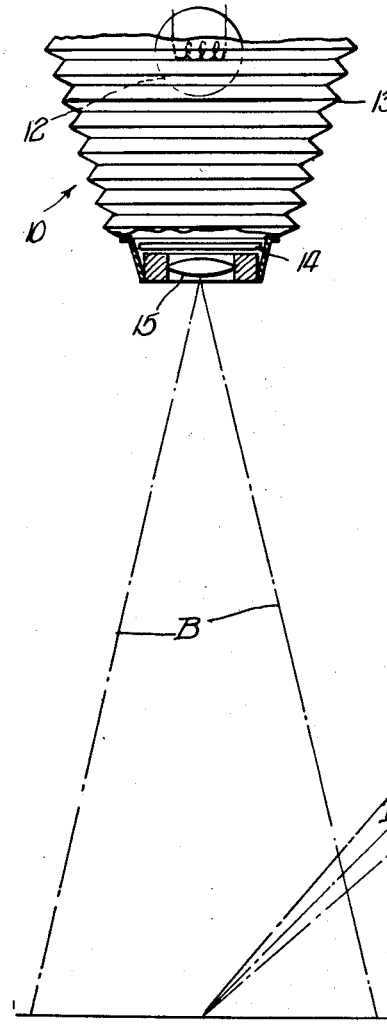
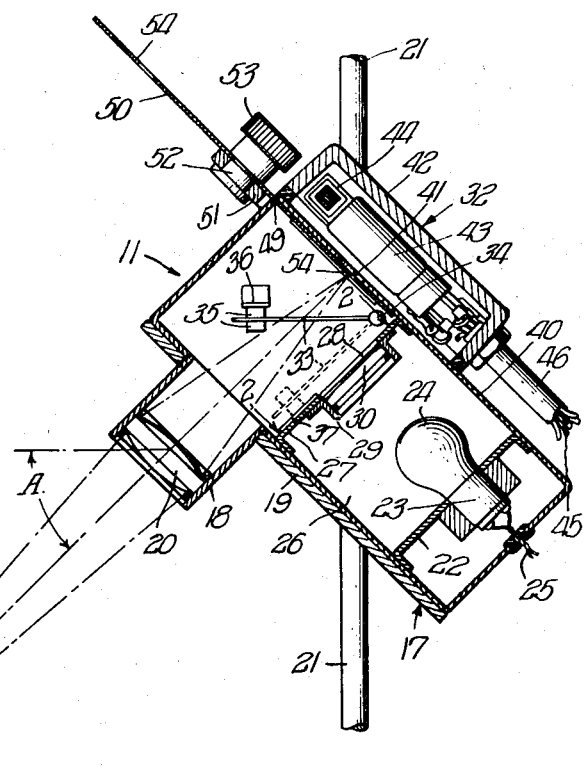
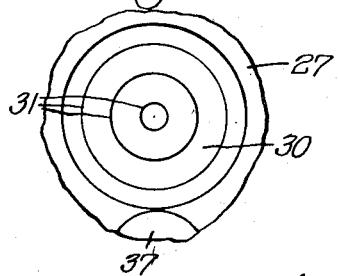
INVENTORS.
Stanton H. Petry,
BY Kenneth E. Grasse,

United States Patent Office 2,800,834
Patented July 30, 1957

2,800,834

PHOTOGRAPHIC EXPOSURE PROBE DEVICE

Stanton H. Petry, Arlington Heights, and Kenneth E. Grosse, Chicago, Ill., assignors to W. M. Welch Manufacturing Company, Chicago, Ill., a corporation of Illinois Application April 19, 1954, Serial No. 423,960

2 Claims. (Cl. 88—24)

The present invention relates to an optical-photoelectric device for use, as an example, in conjunction with a photographic enlarger or other photographic exposure equipment. In such an association an image of a film or negative projected by the enlarger may be preliminarily studied for composition with the assistance of the improved device, after which an evaluation of the light transmissivity or density of the negative, for purpose of exposure, may be had by subjecting a photosensitive tube of the device to light reflected from the projected negative image.

This evaluation is proportionately represented by a photoelectric signal originated by the photosensitive tube, and it may be expressed or used in any desired manner, for example through an indicating meter, after amplification of the signal, or by means of some agency performing a control function on the enlarger. In the last named adaptation photographic paper may be exposed to a projected image of the negative and properly timed automatically in its exposure in relation to the density of the negative, its relationship of light background and dark subject and vice versa, etc., using a timer system of the character shown in the copending application of Jerome R. Batina and Kenneth E. Grosse, Serial No 394,687, filed November 27, 1953.

It is highly desirable, in determining an exposure time for the printing of a negative, to base this finding on the intensity of light at what is generally described as the center of interest of the photograph. It is a matter of judgment on the part of the operator to decide what the center of interest actually is. It is usually an area such as the forehead in a portrait, and the effectiveness of the reproduction depends to a great extent on a proper assessment of the light value at such area.

Known types of photometers and timers, such as beam splitters and the like, which utilize methods other than that herein proposed for determining correct exposure time, as in enlarging, measure the incident light beam directly, in terms of the total light projected through a negative as a whole. One of the disadvantages of these methods as distinguished from one predicated on measurement at a center of interest, is that corrections must be made, frequently for each negative, to obtain a proper tone value for the center of interest. Moreover, variables in the use of these methods, such as an in regard to paper texture and the position of the enlarger head in relation to an easel or work holder, cannot be properly compensated for.

Accordingly, the present invention provides a photographic probe device for indirectly measuring the light value at the center of interest of a projected film which is to be subsequently printed. This is done by measuring, from a specified direction and at a predetermined angle, light reflected from a center of interest of a film image projected onto an appropriately colored and textured surface, this surface corresponding to that on which the photographic paper is to be exposed. Having once established a basic setting for the device in relation to such color and texture, for a given photographic paper, the operator need only re-establish a proper setting or calibration when exposing paper of a different color or texture. This is not particularly objectionable in a large scale photographic printing operation, and in no sense offsets the advantages inherent in the use of the present device in composing by reference to a center of interest.

A significant and important feature of the improved probe for an enlarger or other printer is that its optical system is oriented at a fixed vertical viewing angle and at a fixed vertical distance in relation to the enlarger's paper holder or easel. This automatically avoids variables which, as pointed out above, it is not practical or possible to avoid in other probe or beam splitter arrangements.

It is a general object of the invention to provide an optical-photoelectric probe device of the foregoing character which makes it possible to preliminarily view and compose by reference to a projected image, preferably with the assistance of an appropriately marked reticle means, and then to expose a photoelectric probe unit of the device to radiant light flux reflected from the image, either as the latter is projected directly on a work surface or on a sensitive photographic paper in exposing. In the latter case the photoelectric probe unit is preferably connected in a suitable circuit to indicate a desired exposure time or to perform some operation to terminate the exposure at the end of such time. In any case the exposure interval is a direct function of the intensity of an average radiant light flux reflected from the surface in question and transmitted to a photosensitive electrode of the probe unit.

A specific object of the invention is to provide a timer device as described in the preceding paragraphs, in which a light shielded photoelectric probe is mechanically associated with a suitable light-tight housing in such manner that, under selective control of an operator, the probe may view a projected negative image by reflected light, when exposed thereto, and an auxiliary light in the housing may be caused to direct a composing beam or center of interest defining beam on the image. The auxiliary light is positioned to transmit the composing beam through an appropriately marked reticle, and a reflector by which the reticle image is focused on the negative image is mounted for selective adjustment. So mounted, the reflector also may serve optionally as a shutter, blocking off the reticle beam while the photoelectric probe is viewing the reflected negative image and masking the probe while reflecting the reticle image.

The subject exposure probe also features an adjustable field stop unit or variable aperture by means of which it is possible to still more selectively limit the area viewed by the probe to the center of interest. A determination of the area representative of the center of interest, for example in two portraits of the same degree of enlargement, will depend to some extent upon the color of hair and of background. Resort to the adjustable field stop of the present probe device will enable an operator to employ a larger viewing area on one subject than on another. An illustration would be the compensation for the difference between the pale tones of a blonde subject and the dark tones of a brunette.

The foregoing statements are indicative in a general way of the nature of the invention. Other and more specific objects will be apparent to those skilled in the art upon a full understanding of the construction and use of the device.

A single embodiment of the invention is presented herein for purpose of illustration. It will be appreciated that the invention may be incorporated in other modified forms coming equally within the scope of the appended claims.

In the drawings:

Fig. 1 is a view in vertical central section showing the improved probe device, also indicating the approximate positional relationship of that device to a diagrammatically shown photographic enlarger and work supporting surface; and Fig. 2 is a view in section along a line corresponding to line 2—2 of Fig. 1.

Referring to Fig. 1, the reference numeral 10 generally designates a conventional photographic enlarger, representative of an exposure unit with which the optical-photoelectric probe device 11 of the present invention is intended to be associated in use.

Enlarger 10 provides a lamp or light source 12 in an extensible bellows 13. A photographic negative 14 on a suitable film holder has its image projected by the beam B of lamp 12 through the enlarger lens 15 onto a work surface 16. Sensitive photographic paper is held on or periodically advanced across surface 16 for exposure to the enlarger image; and surface 16, or the paper, if being exposed, will reflect the image of the negative to probe device 11, as indicated by an incremental beam B'. Alternatively, beam B' may be considered to represent a reticle image transmitted from device 11 onto surface 16, as when the device is used in a preliminary composing and adjusting phase. Radiant light flux is reflected from an image on work surface 16 to the device in a timing phase of operation and a reticle image is transmitted from the device to the work surface in the composing phase.

Device 11 comprises a box-like, light-tight housing, generally designated 17, having a tubular lens mount 18 threaded in its forward wall 19, in which mount an achromatic lens 20 is fixedly secured in a known fashion. The housing is appropriately mounted, as on an upright standard 21, so as to allow bodily shifting of the housing in a horizontal plane while preserving a fixed relation of housing to surface 16 in respect to height and angular inclination. Lazy tong devices and similar other provisions for so securing the housing being well known to those skilled in the art, they have not been illustrated in detail.

The lower base of housing 17 is closed by a bottom integral with forward wall 19 and with two housing side walls which connect with wall 19, and a fixed adapter or base plate 22 above the bottom mounts a socket 23 receiving a standard incandescent lamp 24, the wiring 25 for this socket being taken out through the bottom. It may be connected, if desired, in such relation to the leads for lamp 12 of enlarger 10 that the two are simultaneously energized and extinguished. It may additionally be connected to the photoelectric circuit of the device that when the latter is timing the exposure of paper lamp 24 will be extinguished. Provisions to these ends form no part of the invention, however.

The upper end of a light-tight housing chamber 26 in which lamp 24 is thus disposed is provided with a transverse plate 27 having a central reticle aperture 28 formed therein. An annular mount 29 secured on plate 27 beneath this aperture holds a light-transmissive reticle 30.

An illustrative marking of reticle 30 is shown in Fig. 2 of the drawings, involving concentric reference rings 31 whose outline is projected on the image on work surface 16 by beam B'. This is for the purpose of determining to which part of the area of the negative image the photoelectric unit of device 11, generally designated 32, is best focused, and housing 17 is then adjusted and secured to focus on that part of the area, as previously described, at the real center of interest.

It is to be understood that various negatives 14 will differ widely in the distribution of their light and dark areas, in the density of their dark areas, etc. Lamp 24 and reticle 30 constitute a tool for so focusing the device to the end that the light flux reflected to unit 32 will represent an optimum flux to generate a photoelectric current by which a timed subsequent exposure is most accurately ascertained.

The device is controlled in the switch-over from its adjusting and composing function to its phootelectric probe function and vice versa by means of a flat, opaque reflector 33 hinged on a fixed pivot 34 in housnig 17. Pivot 34 may take the form of a transverse pin on which the reflector is mounted, suitably journalled in the housing and having an external finger piece (not shown), so that reflector 33 may be flicked in one direction or another about its pivot under the control of the operator.

The reflector 33 has at its outer end a pair of opposed positioning magnets 35 for the purpose of holding the same in one or the other of its adjusted positions. These magnets coact with a stop 36 of magnetic material carried by a side wall of the housing, in elevated relation to reticle aperture 28, and with a similar stop 37 secured on reticle mounting plate 27 to one side of the reticle aperture. Accordingly, when reflector 35 is flipped upwardly, its upper magnet 35 will draw the same rapidly toward stop 36, holding the reflector in this position. A beam B' from lamp 24 transmitted through reticle 31 will now reflect from the lower surface of reflector 33 and be focused by lens 20 on work surface 16, in a position of the reticle relative to an enlarger-transmitted image which is determined by horizontal bodily shifting of device 11, as described above. The latter is brought to properly adjusted position by reference to the images transmitted by the two beams B, B'. The reflector in elevated position blocks from unit 32 light originating at lamp 24 or reflected from work surface 16.

When reflector 33 is flipped in the opposite direction, its lower magnet 35 snaps the same into fixed engagement with the stop 37 in the housing. It now acts as a shutter for the beam from lamp 24, should it not be desired to extinguish the same automatically at this phase of the operation, and exposes unit 32 to the reflected beam from surface 16, or a sensitive photographic paper thereon.

Timing may now be performed, either automatically, with paper in place on surface 16 and using a signal originated by unit 32 to control enlarger 10, or simply as a preliminary to exposure in which a signal proportionate to reflected flux is impressed, after appropriate amplification, on an appropriate meter or other indicator of a proper exposure time. Since the present invention solely concerns structural features and the operation of device 11 as a photosensitive composing and timer probe, further arrangements for the amplification and special application of the photoselective signal have not been illustrated.

Turning now to probe unit 32, a rear plate 40 of light-tight housing 17 is provided with an opening 41 in axial alignment with forward lens mount 18, through which the reflected beam B' passes into an insulated casing 42 of photoelectric unit 32, which is appropriately secured on the rear of housing 17 in light-tight relation thereto, constituting in effect a part thereof. This beam, focused by lens 20, is transmitted to the cathode of a conventional phototube 43 causing electron flow in the latter. The photoelectric current is preferably magnetically modulated, in accordance with the teachings of the patent to Kalmus et al. No. 2,605,428 of July 29, 1952 into an alternating one. This is done by means of an electromagnet 44, in the field of which tube 43 is positioned and which is appropriately energized, along with the electrodes of the tube, through leads 45 in a protective sheath 46 brought into casing 42. The relatively weak modulated phototube current is then built up in a conventional alternating current amplifier (not shown).

It is desirable to provide means to further regulate the amount of reflected light transmitted to phototube 43, and for this purpose the side and top walls of housing 17 have a narrow slot 49 formed therein adjacent the rear thereof, into which a rotatably adjustable field stop disk 50 extends. Disk 50 is appropriately journalled in a fixed bracket 51 secured to housing 17 by a shaft 52, which may be provided with a finger knob 53 for the rotative manipulation of the disk. A circumferentially spaced series of stop apertures 54 of graduated size are formed in stop disk 50, their centers equidistant from the axis of the disk at a radius which puts them in axial alignment with the lens 20 and with the center of opening 41 to photocell casing 42. Manual adjustment of this disk 50 enables any desired stop aperture 54 to be positioned to control the radiant flux impinging on photocell 43, as desired, from the center of interest.

In use, a negative 14 is positioned on enlarger 10, the enlarger is properly adjusted to focus an image thereof on work surface 16, the reflector 33 is held by magnets 35, 36 in the raised position shown in solid lines in Fig. 1, and the lamp 24 is illuminated. The operator now simply manipulates the housing 17 about its axis normal to the work surface 16 to focus on a desired area center of interest of the reticle image, as reflected onto the work surface. When the device is properly positioned, it is locked in place by appropriate means (not shown) and field stop 50 is manipulated as desired, so as to restrict the area to be viewed by the probe to the important part of the center of interest, whereupon reflector 33 is flipped downwardly to the dotted line position of Fig. 1, in which it blocks reticle aperture 28. Lamp 12 of enlarger 10 is then energized simultaneously with energization of the photoelectric circuit of unit 32, either manually or automatically through actuating and holding relay provisions such as are illustrated and described and the above identified application of Batina and Grosse, phototube 43 originating a photoelectric surge proportionate to the intensity of light reflected from the center of interest.

Since phototube 43 responds to the total light viewed thereby, the photoelectric signal accurately reflects average density and, inversely, the light transmissivity of negative 14. Accordingly, it is seen that the provision of a composing reticle, which is adjustably positionable, makes it possible to dispense with special provisions for compensating for changes in total reflected light such as result from an adjustment of the enlarger for magnification. Likewise, no corresponding adjustment need be made for different types of sensitive paper exposed at work surface 16.

As illustrated in Fig. 1, the angle A of lens 20 and beams focused thereby, in relation to the horizontal, is approximately 45 degrees, and the device 11 is so located with reference to enlarger 10 and work surface 16 as not only to avoid interference with the enlarger beam, but also to avoid as much as possible the general field of reflected light approaching and generally reflected from the work surface. In regard to this, adjustable field stop disk 50 makes it possible to adjust over a wide range the total light transmitted to phototube 43, after the probe unit has been initially focused at the general area of the center of interest.

We claim:

1. A photographic exposure probe device including a housing carried by adjustable means to locate said housing relative to an image projected onto a light reflective surface, a photosensitive element carried in an enclosure associated with the rearwall of said housing and in communication with the interior of said housing by means of an adjustable aperture, a lens system carried by the front wall of said housing and optically aligned with said adjustable aperture to allow the transmission of light reflected from said surface to activate said photosensitive element, a portion of the interior of said housing removed from the optical axis of said lens system and said aperture being subdivided by a transverse partition which carries a reticle, a light source in said housing portion to transmit light through said reticle along an axis which intersects the optical axis of said lens system and said aperture, and movable reflecting means carried within said housing, said reflecting means being of sufficient size to completely shield said aperture in one position from light reflected by said surface in a direction along said optical axis and in this position reflect light transmitted through said reticle toward said surface, the size of said reflecting means being further adequate to completely cover said reticle in another position to allow uninterrupted activation of said photosensitive element in response to light reflected by said surface.

2. A photographic exposure probe device including a housing carried by adjustable means to locate said housing relative to an image projected onto a light reflective surface, a photosensitive element carried in an enclosure associated with the rear wall of said housing and in communication with the interior of said housing by means of a variable aperture, a lens system carried by the front wall of said housing and optically aligned with said variable aperture to allow the transmission of light reflected from said surface to activate said photosensitive element, a portion of the interior of said housing removed from the optical axis of said lens system and said aperture being subdivided by a transverse partition which carries a reticle, a light source in said housing portion to transmit light through said reticle along an axis which intersects the optical axis of said lens systems and said aperture, and movable reflecting means carried within said housing and being positionable to interrupt the optical axis of said lens system and said aperture and reflect light transmitted through said reticle by said light source through said lens sysem onto said image in which position said photosensitive element is shielded solely by said reflecting means from light reflected by said surface, said reflecting means being further positionable to move out of the optical axis of said lens system and said aperture into covering relation with said reticle to allow uninterrupted transmission of light reflected by said surface along said optical axis to activate said photosensitive element.

References Cited in the file of this patent

UNITED STATES PATENTS

| | | |
|---|---|---|
| 1,990,361 | Bailey | Feb. 5, 1935 |
| 2,282,045 | Fleischer | May 5, 1942 |
| 2,668,474 | Rogers | Feb. 9, 1954 |